United States Patent Office 3,452,598
Patented July 1, 1969

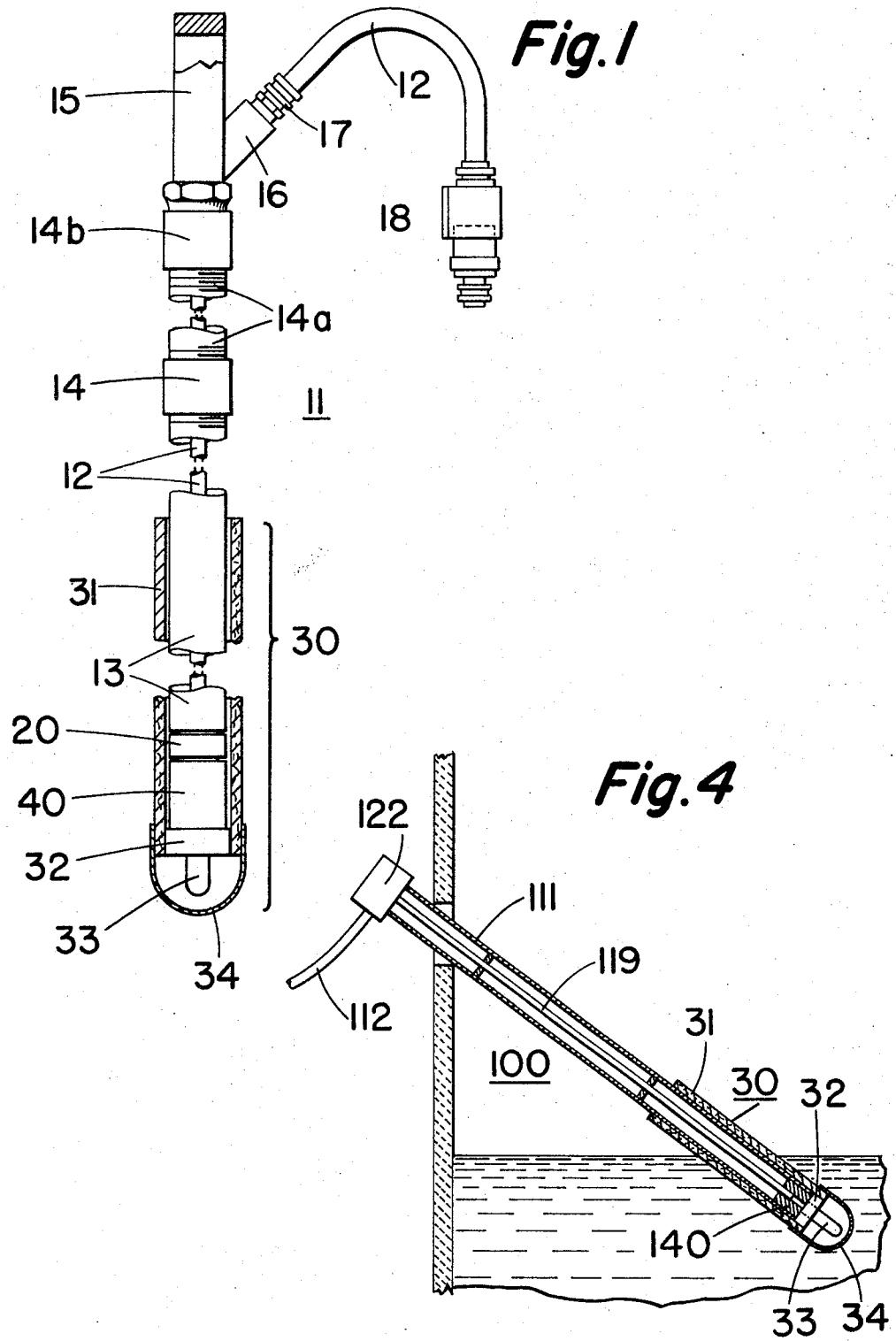

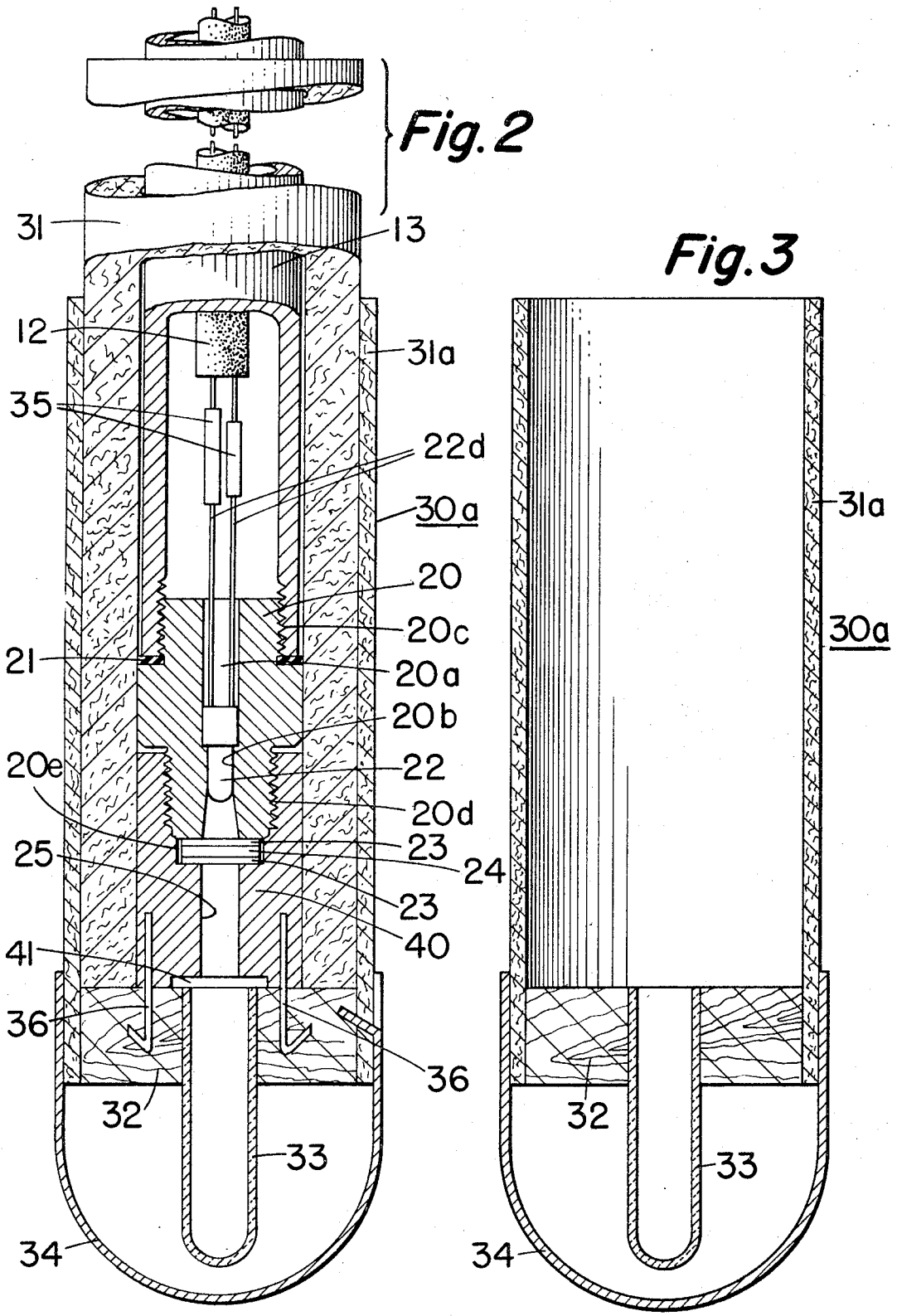

3,452,598
IMMERSION RADIATION PYROMETER DEVICE
Louis R. Jones, Jr., Huntingdon Valley, Pa., assignor to Leeds & Northrup Company, Philadelphia, Pa., a corporation of Pennsylvania
Filed Sept. 6, 1967, Ser. No. 665,771
Int. Cl. G01k *1/08*
U.S. Cl. 73—355
10 Claims

ABSTRACT OF THE DISCLOSURE

A radiation pyrometer probe for measuring the temperature at a subsurface level of a bath of molten material for which a slide-on, expendable protection unit is provided. The protection unit includes a plug supporting a thimble of refractory material which forms a closure for the immersion end of the protection unit and supplies radiant energy to the radiant energy sensing element thereof. A protective cap of heat destructible material is affixed to the immersion end of said slide-on protection unit in surrounding relation to the thimble to protect it prior to use and during insertion through the slag on a bath of molten material.

Background of the invention

Prior to the introduction of expendable immersion thermocouples such as disclosed and claimed in, for example, U.S. Patent 2,999,121, H. G. Mead, one way of measuring the temperature at a subsurface level in a bath of molten material, such as molten steel, was to employ an immersion radiation pyrometer apparatus of the type disclosed and claimed in U.S. Patent 2,493,078, H. G. Mead. Devices of this type, while making it possible to measure the temperature of a bath of molten steel rapidly and with a minimal cost per temperature measurement, had as a disadvantage the need of a supply of compressed air which was continuously introduced at the end of the device exterior of a furnace in order to keep the lead-wire structures and radiant energy receiver cool, prevent the ingress of molten metal and fumes, and a produce a blackbody cavity at a subsurface level of the molten bath to provide a target onto which the radiation sensitive element was sighted. Devices of this type were rendered somewrat bulky and unwieldy by the inclusion of an air pressure gage in the end thereof opposite the immersion end and a heavy industrial weight air hose connected at that end. The air hose represented a continual problem since it had to be moved around in order to keep it from being run over or tripped over.

Summary of the invention

In accordance with the present invention, an immersion type radiation pyrometer device is provided with a radiant energy sensing element protected from heat in a manner which eliminates the need to provide compressed air for cooling the radiant energy sensing element and the leads thereto and there is provided an expendable, slide-on protection unit at the immersion end thereof which obviates the need to use a flow of air to produce a blackbody cavity. This slide-on protection unit is comprised of a tube of heat insulating material having a plug of heat insulating material in the immersion end thereof which supports a radiant energy source in the form of a thermal shock-proof refractory material of small mass forming an end closure for the tube and preferably a cap or enclosure of material destructible by heat is provided in surrounding relation with the radiant energy source to protect it until the device is used and during the act of immersing the device to a position beneath the surface of the bath of molten material, the temperature of which is to be measured.

In a preferred embodiment of the invention, a silicon photodiode is used as the radiant energy sensing element together with a filtering plate which limits the response of the silicon photodiode to a band of wavelngths throughout which the output from the siliconphotodiode is independent of change in ambient temperature and the materials of the protection unit are low-cost cardboard for the tube, fused silica or high temperature glass in the form of a thimble for the radiant energy source, and thin sheet steel for the cap.

Brief description of the drawings

For a more detailed understanding of the invention, reference is made in the subsequent description of preferred embodiments thereof to the accompanying drawings in which:

FIG. 1 is a side elevation, partially in section, of one form of the invention;

FIG. 2 is a side elevation, on an enlarged scale, of a modification of the immersion end of the device of FIG. 1 with parts broken away to show details of construction not shown in FIG. 1;

FIG. 3 is a side elevation in section of the slide-on, expendable protection unit of FIG. 2; and FIG. 4 is a diagrammatic showing of another form of the invention partly in section and the manner in which it is used.

Description of the preferred embodiments

Referring to FIG. 1, the invention has been shown as applied to an immersion pyrometer device of the type having an end thereof momentarily immersed in molten material in a manner illustrated in FIG. 4. The arrangement of FIG. 1 includes an elongated pole-like manipulator structure 11 containing a heat-resistant electrical lead-wire cable 12 supported within a pipe 13 internally threaded at its immersion end and externally threaded at the end opposite the immersion end. This latter end is connected by means of a coupling 14 and a short nipple 14a and a second coupling 14b to a cast handle structure 15 having an outlet 16 and a bushing 17 through which passes the cable 12. The cable 12 at the handle end terminates in a connector device 18 for connecting the immersion radiation pyrometer device to a cable and measuring instrument not shown. The immersion end of cable 12 is connected to a radiant energy sensing element supported in a housing 20, 40 described more fully hereinafter when describing features disclosed in FIG. 2.

In FIG. 1, the outer diameter of the pipe 13 and the outer diameter of the housing structure 20, 40 are substantially equal and receive a slide-on expendable protection unit 30 which is a complete assembly, one element of which is a tube of heat insulating material preferably of cardboard such as tube 31 having an inner diameter which is a free, sliding fit over the pipe 13 and housing structure 20, 40. The tube 31 has as another element of the protection unit a plug 32 preferably of cork or other resilient material forced into the immersion end thereof. Its retention may be further insured by the use of glue or cement. The plug 32 has mounted therein as another element of the protection unit a thimble 33 which projects outwardly therefrom and forms a source of radiant energy to be measured. The thimble 33 preferably comprises a closed end tube of fused silica, or high temperature glass, which is shock-proof with respect to the heat of a bath of molten material and sufficiently transparent to radiant energy throughout a band of wavelengths to obtain an adequate signal and a high speed of response from the radiant energy sensing device. The thimble 33 may have a pressed fit in a hole in the plug 32 or be otherwise supported as by suitable cement. While a thimble 33 of fused silica, transparent to radiant energy, is presently preferred, it should be understood that other suitable materials, opaque to radiant energy, may be used provided they assume the temperature of the bath, when immersed therein, with sufficient rapidity to produce the necessary radiant energy by reradiation. A heat-destructible enclosure may be included as an element of expendable protection unit 30 in the form of a thin metal cap 34 secured to the immersion end of the cardboard tube 31, for example, by punching portions of the metal cap into the cardboard tube. Caps of 28-gage mild carbon steel have been found suitable when the molten material is steel.

Referring to FIG. 2, the structure inside the immersion end of the pipe 13 and housing 20, 40 is shown in greater detail, and in addition there is shown a modified form of slide-on expendable protection unit 30A. The same reference numerals employed in connection with the description of FIG. 1 are used for corresponding parts in FIG. 2.

In the preferred embodiment of the invention, the radiant energy sensing element 22 supported within housing 20 is a silicon photodiode. The diode housing 20 may be of plastic or other suitable material having a counterbore 20a and a hole 20b, with a tapered outer end, to receive the diode 22. The diode 22 has leadwires 22a which are connected to the individual wires of the leadwire cable 12 as by crimp connectors 35. The immersion end of pipe is internally threaded to receive the threaded end 20c of diode housing 20. A rubber washer 21 having an outer diameter slightly greater than the outer diameter of the diode housing 20 may be included between the housing and the immersion end of the pipe. This washer 21 is useful in providing a frictional engagement with the interior of the cardboard tube 31 to aid in its retention on the pipe 13.

The immersion end of the housing 20 includes a threaded portion 20d to engage a mating threaded portion of diode housing element 40. Element 40 has a counterbore 20e for the reception of a pair of washers 23 between which is located a window which may comprise a filter 24 to limit the band of wavelengths of the radiant energy received by diode 22 to a band below about 0.9 micron to render the output of the diode substantially independent of ambient temperature in a manner disclosed in U.S. application Ser. No. 451,539, filled Apr. 28, 1965, F. K. Schroyer et al. The hole 25 through the housing element 40 provides an optical stop limiting the radiant energy received by the silicon photodiode 22 to radiant energy from the walls of thimble 33. The lower end of housing element 40 has a counterbore 41 which provides clearance over the open end of thimble 33 when the protection unit 30 (FIG. 1) or 30A (FIG. 2) is pushed into place.

In the description of FIG. 1, the expendable protection unit 30 was described as including the cardboard tube 31. A further reduction in the cost of maintenance of applicant's radiation pyrometer device may be effected by reuse of the cardboard tube 31 by employing a modified slide-on expendable protection unit 30A wherein there is utilized a shorter, and if desired, a thinner walled cardboard tube 31a which, like tube 31 of FIG. 1, is closed by a cork plug 32 which supports a fused silica thimble 33 which is in turn preferably surrounded by a protective metal cap 34 fastened to the cardboard tube 31a. This construction effects reduction in the cost of the expendable parts since the heavier cardboard tube 31 may be used for several immersion temperature measurements and the slide-one expendable protection member having tube 31a, which need only last two or three seconds, is reduced in weight and volume, thus effecting a reduction in the material and shipping costs. While cardboard tubes have been used in practicing applicant's invention it is clearly understood that tubes of other materials may be used as long as adequate heat-insulation is provided for a sufficient length of time.

In order to insure retention of the additional expendable protection unit 30 or 30A with respect to the pipe 13, housing elements 20, 40 and cardboard tube 31, a pair of pins 36, FIG. 2, secured in and protruding from the housing element 40 are provided for penetration into frictional engagement with the cork plug 32. The pins 36 may desirably terminate in fish hook like portions or be grooved more securely to hold the protection tube in place.

While FIGS. 1 and 2 show a pipe 13 which in practice of the invention would be in the order of eight or nine feet long in order to serve as an elongated mainpulator structure for thrusting a radiant energy responsive device to a subsurface level of a molten bath in a furnace of, for example, the open-hearth type, it is to be understood that pipe 13 may instead be only three to four feet long and the outer end opposite the immersion end secured by a clamp to a cable structure sufficiently well insulated for repetitive use at temperatures of the order of 3,000° F. The cable 12 and pipe 13 may be water-cooled by including ducts for cooling water in the cable. Either of the latter structures could be used for insertion through the top of a furnace which is a technique most applicable to furnaces employed in the basic oxygen process. If pipe 13 is adapted to be lowered into a furnace by a heavy cable carrying leadwires, it is necessary to provide a weight on the structure at a location preferably adjacent the upper end of cardboard tube 31 opposite its immersion end in order to overcome the buoyancy of the bath and force the immersion end of the radiation pyrometer device to a subsurface level in the bath of molten material. While plastic has been mentioned for housing elements 20, 40 and cork for the plug 42, it is to be understood that other suitable materials may be used.

In FIG. 3, the parts 31a, 32, 33 and 34 have been shown in their assembled relation clearly to indicate the nature of the expendable protection unit 30A for the radiation pyrometer. It will be understood that in place of the relatively thin cardboard tube 31a, the cardboard tube may be of the thicker type 31 shown in FIG. 1.

Referring to FIG. 4, there is shown an immersion radiation pyrometer device 100 in which a radiant energy sensing element 122 is carried at the outer end of a pipe 111 opposite from the immersion end. The effect of placing element 122 at the immersion end of the pipe 111 is achieved by the inclusion of a flexible steel tube 119 enclosing a bundle of flexible fibre optical elements or light pipes with the immersion end thereof terminating in optical stop structure 140 close to the thimble 33 and the opposite end adjacent the radiant energy sensing element 122. Either of the expendable protection units 30 or 30A shown in FIGS. 1 and 2 may be employed in this arrangement with unit 30 being shown.

It should be understood that the invention is not limited to the specific arrangments described and illustrated.

What is claimed is:

1. An immersion radiation pyrometer device of the type including an elongated manipulator structure having an immersion end adapted to be moved to a subsurface level of a bath of molten material, a radiant energy sensing element electrically connected to leadwires for connection of said sensing element to a measuring instrument, said sensing element being supported by said manipulator structure to receive radiant energy from the material of said bath, and an optical stop structure defining a fixed sight path for said radiant energy sensing element disposed between said sensing element and the immersion end of said manipulator structure; characterized by an expendable protection unit slidable onto the immersion end of said maniplator structure, said unit including a tube having the characteristics of heat-insulating material which reacts to the heat and material of said bath at a rate sufficiently slow to protect the immersion end of said elongated manipulator structure from damage for a period of time of at least a few seconds, plug means having characteristics similar to those of said tube supported in fluid-tight relation at the immersion end thereof, a radiant energy source comprised of thermal shock-proof refractory material of small mass rapidly heated by the bath of molten material to the temperature thereof and having a shape providing a radiation-emitting cavity supported by said plug and in fluid-tight relationship therewith and forming a closure for said protection unit at its immersion end to prevent entry of molten material into said elongated manipulator structure, and said optical stop structure being disposed within a few inches of the immersion end of said manipulator structure effectively to restrict application of radiant energy to said radiant energy sensing element to that from said source.

2. An immersion radiation pyrometer device according to claim 1 wherein said radiant energy sensing element is supported by said elongated manipulator at a location away from the immersion end thereof and includes a flexible light pipe having an immersion end within a few inches of said optical stop structure and an end adjacent said radiant energy sensing element to convey radiant energy from said radiant energy source to said radiant energy sensing element.

3. An immersion radiation pyrometer device according to claim 1 wherein said radiant energy sensing element is supported within a few inches of the immersion end of said manipulator adjacent said optical stop structure.

4. An immersion radiation pyrometer device according to claim 1 wherein said expendable protection unit includes a heat-destructible enclosure in surrounding relation with said radiant energy source.

5. An immersion radiation pyrometer device according to claim 1 wherein said tube of heat-insulating material is cardboard approximately one-quarter of an inch thick and the material of said plug means is cork.

6. An immersion radiation pyrometer device according to claim 1 wherein said expendable protection unit is comprised of two concentric tubes, an inner tube which is long, relatively thick, and open at both ends for use more than once and an outer tube of relatively short length and having an inner diameter which is a sliding fit over the outer diameter of said inner tube, said outer tube being relatively short and supporting said plug means and said radiant energy source and said heat-destructible enclosure.

7. An immersion radiation pyrometer device according to claim 1 wherein said radiant energy sensing element is a silicon photodiode.

8. An immersion radiation pyrometer device according to claim 7 wherein a bandpass filter is included in the sight path of the silicon photodiode to limit the radiant energy to the photodiode to that in a band of wavelengths below about 0.9 micron.

9. In an immersion radiation pyrometer device of the type including an elongated manipulator structure having an immersion end adapted to be moved to a subsurface level of a bath of molten material, a radiant energy sensing element electrically connected to leadwires for connection of said sensing element to a measuring instrument, said sensing element being supported by said manipulator structure to receive radiant energy from the material of said bath, and an optical stop structure defining a fixed sight path for said radiant energy sensing element disposed between said sensing element and the immersion end of said manipulator structure; the improvement characterized by an expendable protection unit slidable onto the immersion end of the manipulator structure, said unit including a tube having the characteristics of heat-insulating material which reacts to the heat and material of said bath at a rate sufficiently slow to protect the immersion end of the elongated manipulator structure from damage for a period of time of at least a few seconds, a thimble of thermal shock-proof refractory material of small mass having the characteristic of being rapidly heated by the bath of molten material to the temperature thereof to provide a radiant energy source, said thimble having a shape providing a radiation-emitting cavity, and means supporting said thimble in fluid-tight relation with the immersion end of said tube and forming a closure for said protection unit at its immersion end to prevent entry of molten material into the elongated manipulator structure, the optical stop structure being disposed within a few inches of the immersion end of said manipulator structure effectively to restrict application of radiant energy to said radiant energy sensing element to that from said thimble.

10. In an immersion radiation pyrometer device according to claim 9 wherein said thimble material is fused silica.

References Cited

UNITED STATES PATENTS

| | | | |
|---|---|---|---|
| 1,475,365 | 11/1923 | Schueler et al. | 73—355 XR |
| 1,639,534 | 8/1927 | Ruben | 73—335 XR |
| 1,894,109 | 1/1933 | Marcellus | 73—355 |
| 2,465,322 | 3/1949 | Considine | 73—355 XR |
| 2,490,617 | 12/1949 | Bristol | 73—355 XR |

FOREIGN PATENTS

| | | |
|---|---|---|
| 29,097 | 8/1911 | Great Britain. |

LOUIS R. PRINCE, *Primary Examiner.*

FREDERICK SHOON, *Assistant Examiner.*